Sept. 30, 1952 H. A. YOUKERS 2,612,256
GLASSWARE SPACING DEVICE
Filed Nov. 9, 1946 3 Sheets-Sheet 3
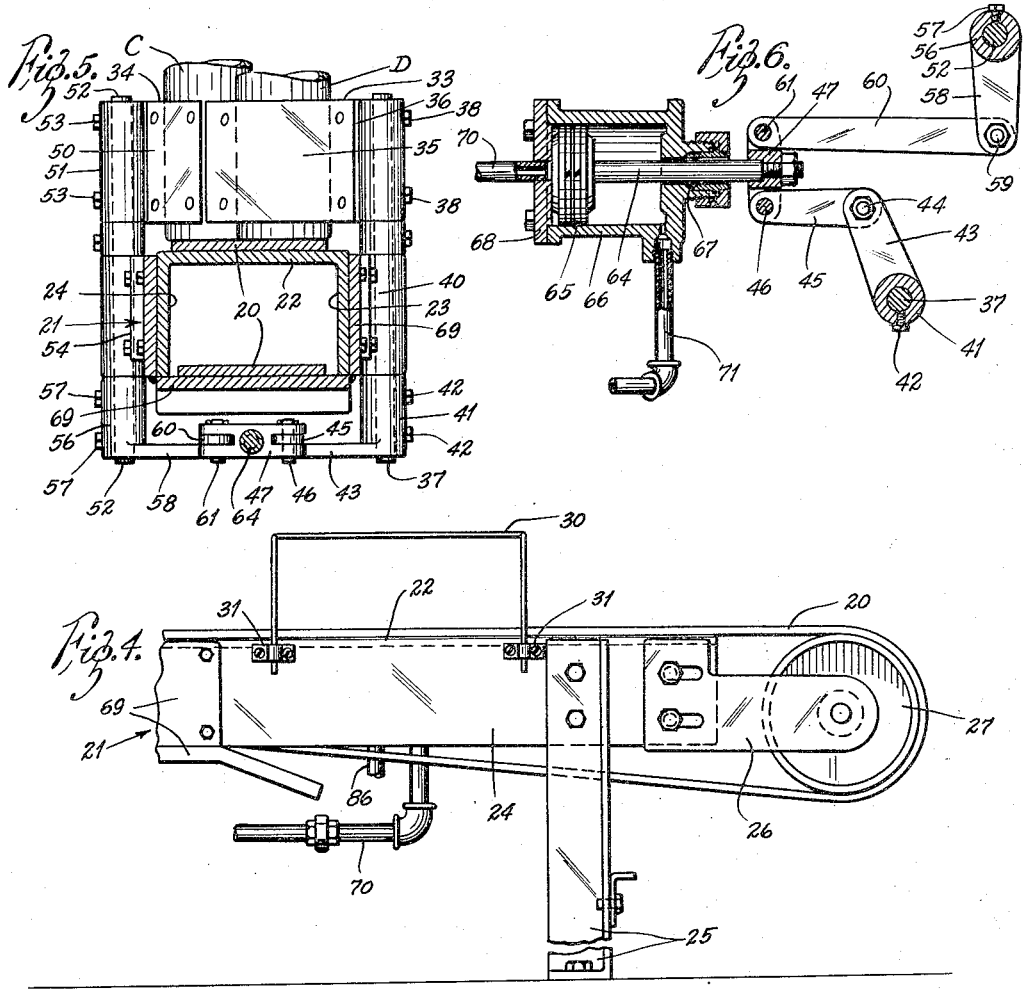
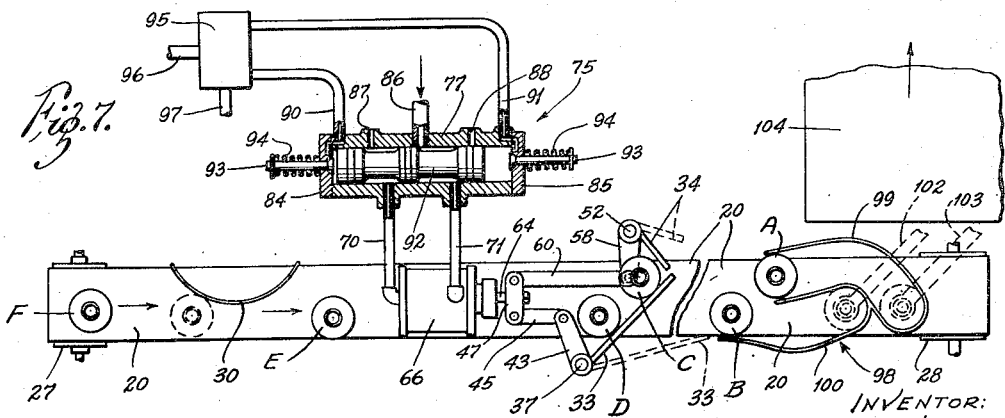
INVENTOR:
HAROLD A. YOUKERS,
ATTORNEYS.

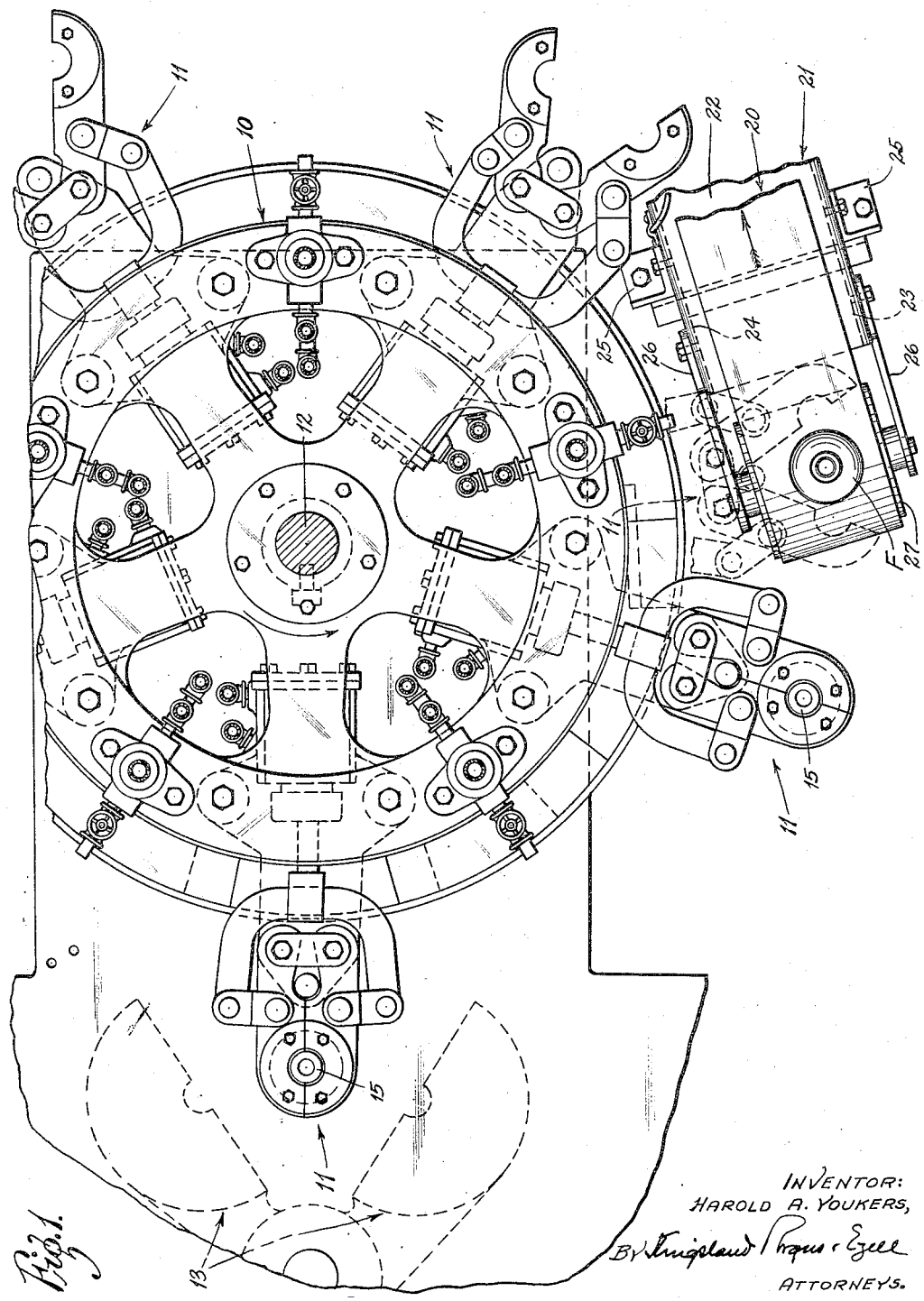

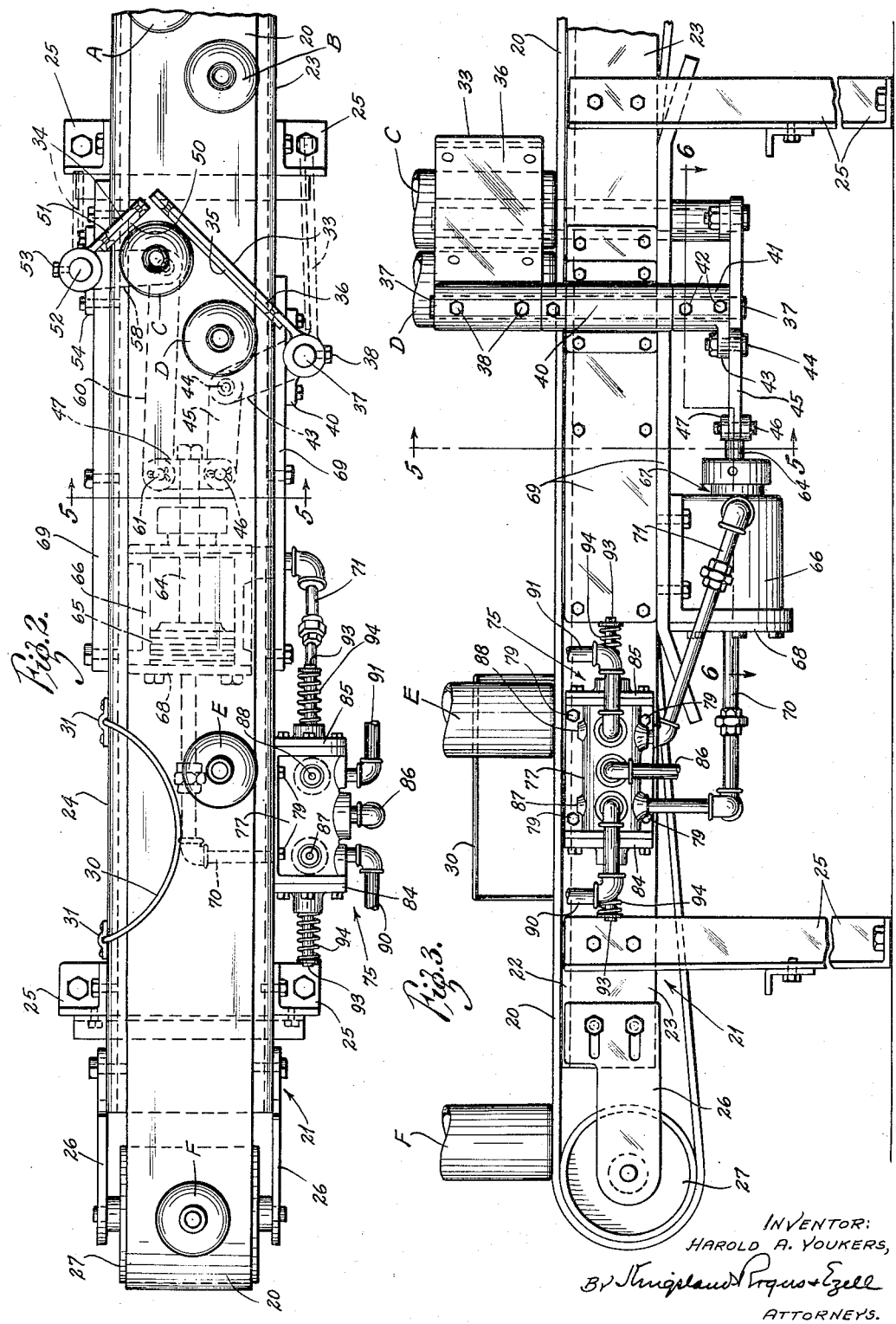

Patented Sept. 30, 1952

2,612,256

UNITED STATES PATENT OFFICE 2,612,256

GLASSWARE SPACING DEVICE

Harold A. Youkers, Knox, Pa., assignor of one-half to Henry C. Daubenspeck, Massillon, Ohio, and one-half to Samuel E. Winder, Washington, Pa.

Application November 9, 1946, Serial No. 708,987

13 Claims. (Cl. 198—31)

The present invention relates to a glassware spacing device for use in connection with the loading of lehrs.

In particular, the present invention relates to a spacing mechanism that may be used with a continuous conveyer that carries glassware items successively deposited on it to a lehr stacking mechanism that transfers the glassware items to an annealing lehr.

It will be understood that glassware, such as glass bottles and the like, is made in a glass forming machine and is taken out therefrom by a take-out mechanism. Conventionally, the forming machine makes the ware continually over a long period of time, one item at a time, and delivers the items successively to the take-out machine, which take-out machine then removes the items from the forming machine and deposits them in succession on a conveyor that moves across the release point of the take-out machine. The conveying mechanism then carries the items of ware to adjacent an annealing lehr. Annealing lehrs conventionally consist of greatly elongated ovens having controlled heat conditions therein, through which relatively wide belts move at relatively very slow speeds. Between the conveyer and the lehr belts, there are the so-called lehr stacking or lehr loading devices, which take the items of ware delivered by the conveyer and transfer them to the slow moving lehr belt.

Many lehr loaders consist of movable members that operate to take the ware intermittently from the conveyer, item by item, and displace it over to a suitable point on the annealing lehr belt. Usually, also, these stackers spread the items of ware across the lehr belt, which is made considerably wider than the conveyor belt, whereby items delivered in rapid succession to the stackers may be all disposed upon the slow moving lehr belt, and many items of ware may be annealed at the same time.

While there are many different kinds of lehr loaders or stackers, for convenience, the present case will be described in connection with the type of stacker having two swinging heads or arms that move down to the conveyer, grip the ware items, and then swing them over to suitable places across the slow moving lehr belt.

Such stacker arms that move down to engage the ware to lift it off of the conveyer belt require a certain amount of time for the operations of moving into position, taking up the ware and moving the ware off of the belt. It is one object of this invention to provide a spacer device that will space the items of ware along the conveyor, so that they will not crowd too closely together to permit the necessary time required for each stacker arm to pick up a piece of ware and get it out of the way before a subsequent item of ware approaches too closely.

A particular object of this invention is to provide a spacer means that delays at least every other item of ware moving successively along a conveyer belt, so that the items of ware in advance thereof may be removed by the stacker mechanism and be out of the way before the retarded item of ware reaches the stacker mechanism.

A particular object of the invention is to provide a spacing device for use with a double stacker, which slows down every other item of ware on a continuously moving conveyer, so that the ware is introduced into the double stacker with sufficient interval between successive pairs of glassware items to prevent interference between ware being transferred by the stackers and ware approaching on the conveyer to be subsequently transferred by the stackers.

A further object of the invention is to provide such a retarding means for certain items of ware on a conveyer that will not upset the ware and tend to cause it to fall from the conveyer. In particular, it is an object of the invention to provide retarding means that applies a retarding action to the ware that acts in a gradual manner to avoid rebound of the ware.

A further object of the invention is to provide a retarding means of the foregoing kind which is synchronized with certain operating mechanism, and particularly with the glass making machinery, so that the ware will be properly spaced as aforesaid along the conveyer.

Specifically, it is an object of the invention to provide a blocking means across the conveyer, which blocking means is positioned to be engaged by oncoming ware, and to retard the travel of the same with the conveyer for a period of time that is determined by the operation of the glass making machinery, and then to remove the obstructing means to permit the ware to travel in the thus retarded position to the lehr loading mechanism.

A further object of the invention is to provide a retarding means of this kind that is timed so that it will relieve the ware prior to the approach of a subsequent piece of ware to such degree of closeness that the two items of ware might come together.

Other objects of this invention will appear as the description follows.

In the drawings:

Fig. 1 is a partial plan view of a ware take-out mechanism showing the disposition of the conveyer in association therewith;

Fig. 2 is a plan view of a portion of the conveyer, with the spacing means associated therewith, the latter being broken away in parts;

Fig. 3 is a side elevation of the mechanism as shown in Fig. 2, looking from the bottom of Fig. 2;

Fig. 4 is a side elevation of the end of the conveyer, taken from the side opposite that in Fig. 3;

Fig. 5 is a vertical section through a portion of the conveyer mechanism in advance of the stacker gates, and taken on the line 5—5 of Fig. 3;

Fig. 6 is a horizontal section through the fluid pressure actuating mechanism for the spacer, taken on the line 6—6 at the lower part of Fig. 3; and Fig. 7 is a diagrammatic view of the conveyer and spacer mechanism.

This spacer mechanism is shown in connection with a take-out machine that is illustrated in a copending application of Samuel E. Winder for Take-Out Mechanism, Serial No. 700,012, filed September 28, 1946.

This take-out mechanism includes a rotating framework 10 having a plurality of take-out devices 11 mounted radially thereon and moved about a central axis 12 that may be synchronized in its movement with the rotation of the glass forming machine, such as that shown in the copending application of Samuel E. Winder, Serial No. 688,470, filed August 5, 1946, for Bottle Forming Machine. It will be understood that the invention of the present application may be used with other take-out devices and forming machines, but it has particular application in connection with those mentioned.

One set of molds is shown at 13 in dotted lines in Fig. 1. The take-out machine takes individual items of hot but completely formed glassware from the open molds 13, lifts each, moves it arcuately and lowers it to place it as shown at F in Fig. 1. It will be understood that the jaws of the take-out devices close over the ware to engage it as it is disposed on the bottom plate of the molds 12, remain closed until they have brought the ware to the conveyer, and then they re-open to release it onto the conveyer.

The conveyer is here shown in the form of a belt, generally indicated at 20. This belt is supported upon a conveyer frame, generally designated at 21, that may be in the form of an inverted channel element 22, having a top wall with depending side walls 23 and 24. Suitable legs 25 support the frame 21 at a desired elevation. The frame has end brackets 26 supporting end rollers 27 and 28, over which the belt 20 passes and by which it is driven. Its speed is coordinated with the speed of rotation of the shaft 12 of the take-out machine, so that it will withdraw bottles 15 from the open take-out devices 11 as the same rotates counterclockwise in Fig. 1. As shown in Fig. 2, a series of bottles A, B, C, D, E and F have been deposited from the take-out machine onto the conveyer belt. As shown by the bottles D, E and F, on the left part of the conveyer, the take-out machine causes the bottles to be evenly spaced along the belt.

As the bottles progress from left to right in Figs. 2 and 7, they are first caused to strike a deflector bar 30 supported in brackets 31 on the side 24 of the frame. This deflector bar is arcuate in shape, so that the bottles, as they meet it, are deflected without abruptness and moved to the right side of the conveyer. Owing to the speed of the conveyer, an abrupt deflection might upset the ware.

Deflector and retarding means are disposed across the conveyer. These comprise two gate devices 33 and 34. The gate 33 includes a plate 35 attached to a swinging arm or wing 36 that is secured by setscrews 38 to a vertical pin 37, to oscillate therewith. The rock shaft 37 is supported in a bearing bracket 40 that is bolted to the side 23 of the frame. The shaft 37 projects below the side 23 of the frame and has a crank 41 attached to its lower end by setscrews 42. The crank 41 has a projecting arm 43, particularly shown in Fig. 6, that is pivoted at 44 to a connecting link 45. This connecting link is pivoted at 46 to a crosshead 47. These pivots are desirably removable to permit replacement of parts.

The other gate 34 includes a plate 50 that is attached to an oscillating arm or wing 51 that is attached to a second rock shaft 52, by setscrews 53. The shaft 52 is supported in a bearing bracket 54 similar to the bracket 40 and bolted to the other side member 24 of the frame 21. The rock shaft 52 projects below the frame and receives a crank 56 that is attached to it by setscrews 57. This crank has a projecting arm 58 that is pivotally attached at 59 to a link 60. This link, in turn, is pivoted at 61 to the crosshead 47. These pivots are likewise removable.

The crosshead is actuated by a fluid piston. To this end, it is attached as shown in Fig. 6 to a piston rod 64 extending from a piston 65 supported in a cylinder 66. A suitable packing gland 67 may be provided for the passage of the piston rod 64 through the end of the cylinder. The other end of the cylinder 66 is closed by a removable cylinder head 68. The cylinder is secured to the bottom of the frame by an elongated bed member 69, in the form of a channel section. This bed member 69 is bolted to the sides of the main frame 21, and extends across the bottom of the frame. The cylinder is bolted to this bed 69.

Two pressure lines connect into opposite ends of the cylinder. One pressure line 70 leads through the center of the cylinder head 68 and the other pressure line 71 leads into the opposite end of the cylinder.

From the foregoing, it may be seen that, when the piston 65 is in the position shown in Figs. 2 and 6, the crosshead will be to the left and the two crank arms 43 and 58 will be drawn leftward. When the piston moves to the right, the crosshead 47 will be moved to the right, and this will ultimately rock the two gates 33 and 34 to positions where they are not across the conveyer belt 20.

The operation of the piston 65 is controlled through a valve, generally designated at 75. This valve includes a valve cylinder 77 bolted at 79 to the side 23 of the frame. The valve cylinder 77 receives two cylinder heads 84 and 85.

A constant source of compressed air is introduced by a line 86 to the middle of the valve cylinder 77. The lines 70 and 71 from the cylinder 66 are connected into the valve cylinder on opposite sides of the air intake 86, and about half-way between it and the ends of the cylinder. Outwardly in each direction from the two working lines 70 and 71 are two exhaust ports 87 and 88, leading from the cylinder 77. At the ends of the cylinder are two lines 90 and 91 that connect through the cylinder heads 84 and 85 to the ends of the cylinder.

The cylinder 77 receives a slide valve element 92 having a middle and two end lands spaced by passage areas. Reference to the diagrammatic showing of Fig. 7 will indicate that when the valve is at the left end of the cylinder the work line 70 is connected to the exhaust port 87, and the intake line 86 is connected to the other work line 71, while the exhaust is cut off.

The cylinder heads may each be provided with a push rod 93 slidable therethrough but normally maintained outwardly by a spring 94. These rods are used to displace the valve 92 manually.

The two air lines 90 and 91, as shown in Fig. 7, are connected to the rotary air line timing valve mechanism 95 on the feeder. It will be understood by those familiar with this art that glass feeders are conventionally controlled pneumatically. Typical glass feeders have a forehearth with an orifice in its bottom, above which orifice there is a plunger. When the plunger is forced to descend above the orifice, it extrudes a certain quantity of glass through the orifice, which is thereby suspended above a charging chute that leads to a mold on the forming machine. This charge or gob of glass is severed by shears that are operated in timed relation with the plunger. After the shearing operation, the plunger is caused to rise again, drawing the projecting stub of glass back into the forehearth.

The foregoing cycle of operation is timed by a valve mechanism that alternately applies differential pneumatic pressure to opposite sides of a piston on the plunger and alternately applies pneumatic pressure to opposite sides of a piston that operates the shears. It will also be understood, by those skilled in the art, that this timer properly coordinates these operations to get the desired shape of glass, and performs the operations at time intervals that are coordinated with the speed of the forming machine. The take-out machine is likewise coordinated with the speed of the forming machine, and the conveyor belt of the present application is driven at a speed that is proper for the rotary speed of the take-out machine. The foregoing will show that the disposition of the several bottles along the conveyor 20 is keyed to the speed of operation of the feeding mechanism. Hence, diagrammatically, it may be indicated in Fig. 7 that the rotary air line timing valve mechanism 95 receives air pressure from a source 96 and, by timing means such as an operating shaft 97 in time with the feeding operation, alternately delivers puffs of air pressure to the lines 90 and 91 that lead to the valve 75. As this mechanism 95 is conventional, it need not be described in detail.

At the end of the conveyor, a stop member 98 having two curved stops 99 and 100 receives the bottles of each pair and holds them against further movement. It is attached to the frame 21. The shape of the cups is such that bottles engage them in a manner not to be thrown off the belt. They are held for engagement by the stacker arms. These arms are illustrated diagrammatically at 102 and 103 to load ware onto a lehr belt 104.

Operation

The time interval between successive bottles delivered to the conveyor 20 is determined by the speed of the glass making machinery, and is the same as the interval between successive charges of glass delivered by the feeder. If, for example, the ware, such as the bottles illustrated, is being produced at the rate of sixty per minute, the time interval between successive bottles is one second.

As already mentioned, the lehr stackers, especially when operating at the speeds for double stacking, i. e., stacking by two stacker arms across a wide lehr belt, require more than one second to move into position adjacent a bottle, grasp the same, and remove it, to continue with the figures used for illustration. This means that, if the bottles come up at one-second intervals, the stacker will not have removed one bottle from the path of an oncoming subsequent bottle in time to prevent the subsequent bottle from striking the one, and being knocked over.

The present invention is designed to take ware advancing at intervals shorter than what may be termed the clearance period of the stacker and to change the interval to one greater than the clearance period. This it does by delaying alternate bottles, and then delivering them to the stacker in pairs, which pairs are spaced apart by adequate time intervals. The bottles are stacked in pairs by a double stacker.

The mechanism performs this operation as follows: Each bottle is loaded onto the conveyer substantially at the position of the bottle F in Fig. 7. The conveyor moves in the direction of the arrow. Each bottle strikes the arcuate deflector 30 and is moved to the right side of the conveyer, as shown by the dotted line positions of the bottle in Fig. 7 and the subsequent position occupied by the bottle E in that figure. This disposes all of the bottles on the right side of the conveyer, which is the lower side in Fig. 7.

As one bottle, such as the bottle C, moving down the conveyer on the right side thereof, strikes the deflector gate 33, it will be held back while the conveyer moves on. The movement of the conveyer will cause this bottle E to be deflected across the conveyer by the angular disposition of the gate, until it reaches the point where it engages in the corner between the gates 33 and 34. At this point, it will be retained until the proper release time.

In the meanwhile, the bottle D, as shown in Fig. 2, approaches and moves approximately into contact with the gate 33. In ample time to prevent the bottle D from coming into contact with the bottle E, to which it might stick because of the temperature of the glass, both gates are opened so that the bottles may then move as a pair, with the conveyer, as shown by the pair A and B.

The gate operation is timed by the rotary air line timing valve mechanism 95, which is operated to connect the air pressure line 96 to the lines 90 and 91. When the valve 92 is at the left, the gates are closed, owing to the porting of the air line 86 to the working line 71 to move the piston to the left. At a predetermined time relatively to the feeder and forming machine operations, and hence to the delivery of ware to the conveyer, the rotary timer 95 delivers a puff of air to the line 90, which displaces the valve 92 to the right end of the cylinder. This connects the working line 70 to the air supply 86, and the working line 71 to exhaust, whereupon the piston moves outwardly opening the gates and permitting the ware to be drawn past them. Thereafter the rotary timer reverses the air delivery to the valve 75, and recloses the gates. The bottles, such as the bottles C and D, that were re-spaced by the gates, proceed with the conveyer occupying positions corresponding to the positions of the bottle pair A and B that have already moved beyond the gates. These bottle pairs then proceed to the end of the conveyer, where they may reach the cup-shaped holders 99 and 100. These holders are shaped to receive the bottles and place them in positions for engagement by the arms of the stacker. It will be understood that, if the conveyer approaches the stacker at a different angle, these holders will be modified accordingly.

It will be noted that the gate 33 is disposed at an angle across the conveyer. This prevents the bottle that strikes this gate and is retarded thereby from being deflected off of the conveyer. If the gate were not at such an angle, but were, for example, squarely across the conveyer, an oncoming bottle striking the gate would tend to bounce off and might be thrown from the conveyer. The present arrangement causes a more gradual action against the leading bottle, which is such as to prevent its being bounced from the conveyer. Also, when such a bottle as the bottle C engages in the angle between the two gates, it is securely held against lateral deflection off of the conveyer.

The deflector 30 causes the bottles initially to pass down the right side of the belt. This permits the bottles that engage the gate 33 to be retarded more gradually because the halting action takes place down the length of the gate 33. Also, it insures that the subsequent bottle, such as the bottle D, has less likelihood of actually engaging the bottle C.

Promptly after a pair of bottles has cleared the path of the gates 33 and 34, the rotary air line timing valve mechanism 92 reverses the conditions applied to the valve 75, which is in turn reversed by the application of compressed air to the line 91 and the connection of the line 90 to exhaust. As the valve 75 is thus subjected to reverse pressure conditions, it moves back to the left hand position shown in Fig. 2, in which the line 71 is then connected to compressed air and the line 70 to exhaust through the line 88. The piston 65 moves back to the left, closing the gates before the subsequent bottle E reaches them.

The foregoing mechanism is thus capable of obtaining its objectives, the primary one of which is to so space bottles moving relatively rapidly, or at spacing intervals that are relatively short, so that the lehr loader can properly remove one bottle before a subsequent one would strike the same.

What is claimed is:

1. A device for use with a moving conveyer having a plurality of objects supported thereon at spaced intervals to group the articles on the conveyer, comprising movable means engageable by articles moving on the conveyer to retard movement of the articles, and means to position the movable means across the conveyer at predetermined intervals whereby the movable means engages selected ones of the articles to retard said selected ones relative to those adjacent while the conveyer continues to operate, and means thereafter to remove said movable means from the path of the articles at substantially the time a subsequent item arrives at the movable means so that the article may thereafter travel at the same rate.

2. A grouping device for use with a moving conveyer upon which successive items of glassware or the like are supported, and a loading device movable to engage said items in predetermined numbers and cause their transfer to a lehr or the like, said loading device requiring a clearance period greater than the interval between the successive items, said grouping device comprising a grouping means positionable to engage selected items on the conveyer to retard movement of each selected item so engaged while the conveyor continues to operate, and thereby increase the time interval between said item and the one ahead of it to an amount greater than said clearance period, and means to operate said grouping means into and out of grouping position, including means to control said time interval to cause the grouping means to move to position to retard one item and then to withdraw at substantially the time a subsequent item reaches it.

3. A spacing device for glassware produced by a glassware machine producing glass articles at a predetermined rate, comprising a moving conveyer upon which the articles are successively placed, a base, a deflector to dispose all of the articles toward one side of the conveyor, gate means comprising two gate members mounted pivotally on the base on opposite sides of the conveyer, said gates extending across the conveyer at angles forming a V opening toward oncoming articles, the gate member on the side to which the articles were deflected being long enough to deflect them to the other side of the conveyer, means for pivoting the gate members to withdraw them from the conveyer including power means on the base, and control means interconnected with the glassware machine for operating the power means at spaced intervals so that the gate members retard every other article for a predetermined period, and means in the control means to operate the power means to withdraw the gate members prior to the colliding of a subsequent article with the one retarded.

4. A spacing device for glassware produced by a glassware machine producing glass articles at a predetermined rate, comprising a moving conveyer upon which the articles are successively placed, a base, a deflector to dispose all of the articles toward one side of the conveyer, gate means comprising two gate members mounted pivotally on the base on opposite sides of the conveyer, said gates extending across the conveyer at angles forming a V opening toward oncoming articles, the gate member on the side to which the articles were deflected being long enough to deflect them to the other side of the conveyer, means for pivoting the gate members to withdraw them from the conveyer including power means on the base, and control mechanism interconnected with the glassware machine for operating the power means at spaced intervals so that the gate members retard every other article for a predetermined period, and means in the control mechanism to operate the power means to withdraw the gate members prior to the time a subsequent article has engaged the long gate and moved to said other side of the conveyer.

5. An apparatus for grouping articles traveling single file in a predetermined line on a conveyer, so that they will travel in laterally spaced groups, comprising an obstruction, means positioning the obstruction in the path of the traveling articles, said means being adapted to withdraw the obstruction from the said path, to permit the articles to move with the conveyer, said obstruction comprising a deflector engageable by articles on the conveyer, the deflector extending from the path of travel of the articles to a position laterally of said path to displace articles on the conveyer to such lateral position and to retard their forward movement, and timing means to operate the positioning means to dispose the obstruction across the conveyer at intervals larger than the interval between successive articles on the conveyer, to group the desired number of bottles, said timing means being adapted to hold the positioning means in said position until at least one of said articles has engaged the obstruction and been laterally positioned, and then to operate the positioning means to withdraw the obstruction.

6. An apparatus for grouping articles traveling single file in a predetermined line on a conveyer, so that they will travel in laterally spaced groups, comprising a deflecting obstruction, means positioning the obstruction across the conveyer in the path of travel of the articles, the obstruction being shaped to displace articles moved against it laterally from said path of travel, timed means to move the obstruction, said timed means being adapted to introduce the obstruction to position across the conveyer and to hold it there until a predetermined number of articles have been laterally displaced, thereby forming a group, and then to withdraw the obstruction to permit said articles of said group to be conveyed, and finally to return to position across the conveyer to establish another group.

7. An apparatus for grouping articles traveling single file in a predetermined line on a conveyer, so that they will travel in laterally spaced groups, comprising a deflecting obstruction, means positioning the obstruction across the conveyer in the path of travel of the articles, the obstruction being shaped to displace articles moved against it laterally from said path of travel, timed means to position the obstruction across the conveyer to be engaged by articles thereon, said timed means being adapted to maintain the obstruction in such position until at least one article has been laterally displaced, and then to withdraw the obstruction until said article and at least one other article have passed the obstruction, and said timed means having mechanism to repeat the foregoing operations in cycles.

8. An apparatus for grouping articles traveling single file in a predetermined line on a conveyer, so that they will travel in laterally spaced groups, comprising a deflecting obstruction, means positioning the obstruction across the conveyer in the path of travel of the articles, the obstruction being shaped to displace articles moved against it laterally from said path of travel, timed means to move the obstruction, said timed means being adapted to introduce the obstruction to position across the conveyer and to hold it there until a predetermined number of articles have been laterally displaced, thereby forming a group, and then to withdraw the obstruction to permit said articles of said group to be conveyed, and finally to return to position across the conveyer to establish another group, the shape of said obstruction comprising a slope in the direction of movement of the conveyer and laterally thereof.

9. An apparatus for grouping articles traveling single file in a predetermined line on a conveyer, so that they will travel in laterally spaced groups, comprising a deflecting obstruction, means positioning the obstruction across the conveyer in the path of travel of the articles, the obstruction being shaped to displace articles moved against it laterally from said path of travel, timed means to move the obstruction, said timed means being adapted to introduce the obstruction to position across the conveyer and to hold it there until a predetermined number of articles have been laterally displaced, thereby forming a group, and then to withdraw the obstruction to permit said articles of said group to be conveyed, and finally to return to position across the conveyer to establish another group, and an abutment to limit lateral movement of articles displaced by the first-named obstruction.

10. An apparatus for grouping articles traveling single file in a predetermined line on a conveyer, so that they will travel in laterally spaced groups, comprising a deflecting obstruction, means positioning the obstruction across the conveyer in the path of travel of the articles, the obstruction being shaped to displace articles moved against it laterally from said path of travel, timed means to move the obstruction, said timed means being adapted to introduce the obstruction to position across the conveyer and to hold it there until a predetermined number of articles have been laterally displaced, thereby forming a group, and then to withdraw the obstruction to permit said articles of said group to be conveyed, and finally to return to position across the conveyer to establish another group, and an abutment to limit lateral movement of articles displaced by the first-named obstruction, said abutment comprising a second movable obstruction forming a V with the first obstruction, and movable therewith.

11. In combination, a movable conveyer adapted to receive articles in predetermined space intervals and to convey the same in a predetermined path, grouping means comprising an obstruction positioned across the conveyer in said path, the obstruction being shaped to deflect articles from said path to a position laterally thereof and to retard advance thereof when the articles engage it during travel on the conveyer, timed means to hold the obstruction across the conveyer and retard advance of the deflected article until at least one article has been laterally displaced and retarded, and then to withdraw it until said laterally deflected article and at least one additional article have passed it.

12. An apparatus for obtaining two departing linear series of articles on a conveyer from a single approaching line of articles, comprising a deflector, means positioning the deflector across the conveyer in the path of the approaching articles, the deflector being shaped to displace articles urged against it by the conveyer, laterally, and to retard advance thereof, timing means holding the positioning means across the conveyer until one article has been laterally displaced and retarded, and then to withdraw it until said article and one other article has been moved past the conveyer.

13. An apparatus for obtaining two departing linear series of articles on a conveyer from a single approaching line of articles, comprising a deflector, means positioning the deflector across the conveyer in the path of the approaching articles, the deflector being shaped to displace articles urged against it by the conveyer, laterally, and to retard advance thereof, timing means holding the positioning means across the conveyer until one article has been laterally displaced and retarded, and then to withdraw it until said article and one other article has been moved past the conveyer, and means to position the approaching articles in a single line on the conveyer.

HAROLD A. YOUKERS.

REFERENCES CITED

The following references are of record in the file of this patent:

UNITED STATES PATENTS

| Number | Name | Date |
|---|---|---|
| 1,292,178 | Waterman | Jan. 21, 1919 |
| 1,427,325 | Quick | Aug. 29, 1922 |
| 1,579,545 | Langsdorf | Apr. 6, 1926 |
| 2,047,406 | Copping | July 14, 1936 |
| 2,059,177 | Ohrn | Oct. 27, 1936 |
| 2,273,509 | Braren | Feb. 17, 1942 |
| 2,350,479 | Stewart | June 6, 1944 |
| 2,451,104 | Lowe | Oct. 12, 1948 |

FOREIGN PATENTS

| Number | Country | Date |
|---|---|---|
| 818,058 | France | June 7, 1937 |